United States Patent Office 3,002,997
Patented Oct. 3, 1961

3,002,997
PHOTOGRAPHIC PRODUCTS, PROCESSES AND COMPOSITIONS
Milton Green, Newton Highlands, and Myron S. Simon, Newton Centre, Mass., assignors to Polaroid Corporation, Cambridge, Mass., a corporation of Delaware
No Drawing. Filed Jan. 29, 1958, Ser. No. 711,812
6 Claims. (Cl. 260—570.5)

This invention relates to chemistry and, more particularly, to novel chemical compounds which are particularly useful as photographic developing agents.

A principal object of this invention is to provide novel chemical compounds.

Another object is to provide syntheses for preparing the novel compounds of this invention.

It is a further object of the present invention to provide novel compounds, products, developer compositions, and processes employing such novel compounds, products and developer compositions for the development of silver halide emulsions.

A still further object of this invention is to provide novel compounds, products and developer compositions useful in diffusion-transfer reversal processes.

Still further objects of this invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

The novel compounds of this invention may be represented by the formula:

(1)  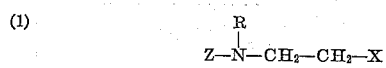

wherein Z is an o-dihydroxyphenyl, a p-dihydroxyphenyl, an o-bis-alkoxyphenyl, a p-bis-alkoxyphenyl, an o-bis-aralkoxyphenyl, or a p-bis-aralkoxyphenyl group; R is hydrogen or an alkyl group, preferably a lower alkyl group, such as for example, methyl, ethyl, etc.; and X is a cyano group or a —CH₂—Y group wherein Y is a primary amino group.

The compounds of Formula 1 may also be present in the form of acid addition salts, such as for example, the hydrochloride or the hydrobromide.

The preferred compounds of this invention are:

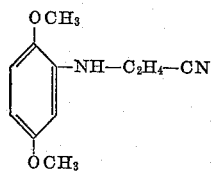

(2) 2-β-cyanoethylamino-1,4-dimethoxy-benzene

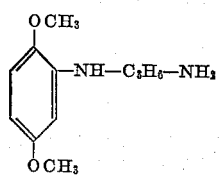

(3) 2-γ-aminopropylamino-1,4-dimethoxy-benzene

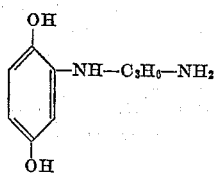

(4) 2-γ-aminopropylamino-1,4-dihydroxybenzene

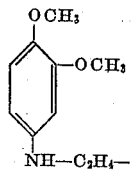

(5) 4-β-cyanoethylamino-1,2-dimethoxy-benzene

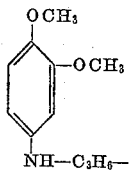

(6) 4-γ-aminopropylamino-1,2-dimethoxy-benzene

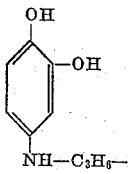

(7) 4-γ-aminopropylamino-1,2-dihydroxybenzene

In general, the novel compounds of this invention may be prepared by reacting a suitable dialkoxyphenyl or di-aralkoxyphenyl compound having substituted thereon a reactive primary or secondary amino group with acrylonitrile.

One method of preparing compounds within the scope of this invention comprises reacting a compound of the general formula:

(8)  

wherein $Z^1$ is an o-bis-alkoxyphenyl, a p-bis-alkoxyphenyl, an o-bis-aralkoxyphenyl, or a p-bis-aralkoxyphenyl group and R has the same significance as in Formula 1; with acrylonitrile in the presence of a suitable catalyst, such as for example, acetic acid.

The resultant product, (9)  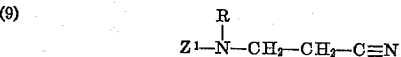

may be directly reduced to yield

(10)  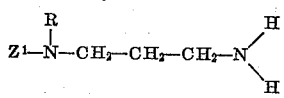

which may be dealkylated to yield

(11)  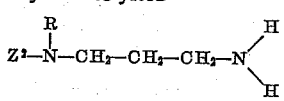

The terms $Z^1$ and R used in Formulas 9 through 11 have the same significance as in Formula 8 and $Z^2$ is an o-dihydroxyphenyl or a p-dihydroxyphenyl group.

Where it is desired to synthesize a compound of the formula:

(12)
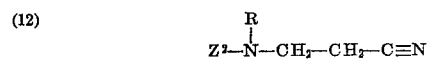

wherein $Z^2$ and R have the same significance as previously noted, it is preferable to dealkylate a diaralkoxyphenyl intermediate, such as for example, a dibenzyloxyphenyl intermediate, for example, 2-β-cyanoethylamino-1,4-dibenzyloxy-benzene or 4-β-cyanoethylamino-1,2-dibenzyloxybenzene.

The invention will be illustrated in greater detail in conjunction with the following specific examples which set out representative preparations of the novel compounds of this invention, which, however, are not limited to the details therein set forth and are intended to be illustrative only.

*Example 1*

To prepare 4-β-cyanoethylamino - 1,2 - dimethoxy-benzene, a mixture of 25 g. (0.163 mole) of 4-amino-1,2-dimethoxy-benzene, 17.5 g. (0.33 mole) of acrylonitrile and 10 cc. of acetic acid is refluxed for 16 hours, the volatile materials removed and the residue fractionated yielding 20.5 g. of the desired product, a viscous liquid, B.P. 168° C. at 0.1 mm. pressure.

*Example 2*

To prepare 4-γ-aminopropylamino-1,2-dimethoxy-benzene, 20.5 g. of 4-β-cyanoethylamino-1,2-dimethoxy-benzene, the product of Example 1, is dissolved in an ammonia gas saturated ethanol solution and the resulting solution contacted for 6 hours with hydrogen at a pressure of 1000 lbs./sq. inch in the presence of a Raney nickel catalyst. The solvent is removed in vacuo and the residue distilled yielding 11 g. of the desired product, a colorless liquid, B.P. 157 to 158° C. at 0.25 mm. pressure.

Analysis of this product:

|  | C (percent) | H (percent) | N (percent) |
|---|---|---|---|
| Calculated at $C_{11}H_{18}N_2O_2$ | 62.7 | 8.6 | 13.3 |
| Found | 62.9 | 8.7 | 13.1 |

*Example 3*

To prepare 4-γ-aminopropylamino-1,2-dihydroxybenzene, 11.0 g. of 4-γ-aminopropylamino-1,2-dimethoxy-benzene, the product of Example 2, is refluxed for 4 hours with 110 cc. of 48% aqueous hydrogen bromide in an atmosphere of nitrogen. The solution is evaporated to dryness in vacuo. The residue is washed with ethanol, ether and dried in a desiccator containing potassium hydroxide. The resulting product, 13.5 g. of an off-white powder, decomposes at 239 to 241° C.

Analysis of this product:

|  | C (percent) | H (percent) | N (percent) |
|---|---|---|---|
| Calculated as $C_9H_{16}N_2O_2Br_2$ | 31.4 | 4.7 | 8.1 |
| Found | 31.3 | 4.8 | 8.0 |

*Example 4*

To prepare 2-β-cyanoethylamino-1,4-dimethoxy-benzene, 2-amino-1,4-dimethoxy-benzene is reacted with acrylonitrile according to the procedure of Example 1. The resulting product exhibits a B.P. of 155 to 156° C. at 2.0 mm. pressure.

*Example 5*

To prepare 2-γ-aminopropylamino-1,4-dimethoxy-benzene, 2-β-cyanoethylamino-1,4-dimethoxy-benzene, the product of Example 4, is reduced according to the procedure of Example 2. The resulting product exhibits a B.P. of 126 to 128° C. at 0.2 mm. pressure.

*Example 6*

To prepare 2-γ-aminopropylamino-1,4-dihydroxybenzene, 2-γ-aminopropylamino-1,4-dimethoxy-benzene, the product of Example 5, is demethylated according to the procedure of Example 3. The resulting product decomposes at 165° C.

Analysis of this product:

|  | C (percent) | H (percent) | N (percent) |
|---|---|---|---|
| Calculated as $C_9H_{16}N_2O_2Br_2$ | 31.4 | 4.7 | 8.1 |
| Found | 31.7 | 4.8 | 8.1 |

The starting materials exemplified in Examples 1 and 4 may be modified and/or substituted, within the limits imposed by the aforementioned general preparation, where it is desired to synthesize further compounds within Formula 1.

The novel dihydroxyphenyl compounds of this invention signified by the previously noted Formula 11 are useful silver halide photographic developing agents in both conventional black-and-white development and diffusion-transfer reversal processes, both dye and silver, and are especially useful in such photographic processes wherein it is desired to eliminate or minimize the need for washing or stabilizing operations in liquid baths subsequent to the formation of the silver print. Examples of such processes are disclosed in U.S. Patent No. 2,647,056 to Edwin H. Land.

By way of example, developer compositions suitable for use in conventional photographic processes, such as tray or tank development of conventional photosensitive films, plates or papers, may comprise:

(1) An aqueous solution of approximately:

|  | Percent |
|---|---|
| 2-γ-aminopropylamino-1,4-dihydroxybenzene | 3.0 |
| Sodium hydroxide | 1.0 |
| Sodium sulfite | 5.0 |
| Potassium bromide | 0.2 |
| Sodium carboxymethyl cellulose | 4.5 |

(2) An aqueous solution of approximately:

|  | Percent |
|---|---|
| 4-γ-aminopropylamino-1,2-dihydroxybenzene | 3.0 |
| Sodium hydroxide | 1.0 |
| Sodium sulfite | 5.0 |
| Potassium bromide | 0.2 |
| Sodium carboxymethyl cellulose | 4.5 |

The addition of a silver halide solvent such as sodium thiosulfate to the aforementioned photographic developer compositions, according to the procedure disclosed in the previously mentioned Patent No. 2,647,056, provides a photographic developer composition useful in diffusion-transfer reversal processes.

It will be apparent that the relative proportions of the novel agents of the developer composition set forth above may be varied to suit the requirements of the operator. Thus, it is within the scope of this invention to modify the above developing composition by the substitution of preservatives, alkalies, silver halide solvents, etc., other than those specifically mentioned. When desirable, it is also contemplated to include in the developing composition common components such as restrainers, accelerators, etc.

Particularly useful developer compositions may also contain a small amount of an auxiliary or accelerating developer such as metol, benzylaminophenol or a 3-pyrazolidone, such as 1-phenyl-3-pyrazolidone. The preferred auxiliary developer is 1-phenyl-3-pyrazolidone.

As previously noted, the novel compounds of this invention wherein X is a —$CH_2$—Y group may be in the form of an acid addition salt. Thus, the salt of the amino developing agents of this invention may be employed where the developing agent is to be incorporated in, on or behind the silver halide emulsion or where one desires to prepare a dry developer composition, the solvent being added to the dry composition prior to use.

Since certain changes may be made in the above product and processes without departing from the scope of the invention herein involved, it is intended that all matter contained in the above description shall be interpreted as illustrative and not in a limiting sense.

What is claimed is:
1. A compound of the formula:

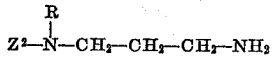

wherein $Z^2$ is selected from the group consisting of o-dihydroxyphenyl and p-dihydroxyphenyl groups; and R is selected from the group consisting of hydrogen and lower alkyl groups.

2. A compound of the formula:

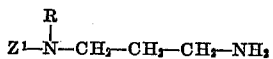

wherein $Z^1$ is selected from the group consisting of o-bis-alkoxyphenyl, p-bis-alkoxyphenyl, o-bis-aralkoxyphenyl, and p-bis-aralkoxyphenyl groups, the alkoxy moiety of said group being lower alkoxy; and R is selected from the group consisting of hydrogen and lower alkyl groups.

3. 2-γ-aminopropylamino-1,4-dimethoxybenzene.
4. 2-γ-aminopropylamino-1,4-dihydroxybenzene.
5. 4-γ-aminopropylamino-1,2-dimethoxybenzene.
6. 4-γ-aminopropylamino-1,2-dihydroxybenzene.

References Cited in the file of this patent
UNITED STATES PATENTS

| | | |
|---|---|---|
| 1,051,577 | Grether | Jan. 28, 1913 |
| 2,482,546 | Kaszuba | Sept. 20, 1949 |
| 2,533,203 | Bean | Dec. 12, 1950 |
| 2,563,375 | Schenck | Aug. 7, 1951 |
| 2,618,657 | Vaughn et al. | Nov. 18, 1952 |
| 2,726,237 | Towne et al. | Dec. 6, 1955 |
| 2,730,523 | Dickey et al. | Jan. 10, 1956 |
| 2,757,091 | Oretzky | July 31, 1956 |
| 2,768,208 | Pedersen | Oct. 23, 1956 |
| 2,865,911 | Nielsen et al. | Dec. 23, 1958 |

FOREIGN PATENTS

| | | |
|---|---|---|
| 499,826 | Germany | June 23, 1930 |

OTHER REFERENCES

Bruson: "Cyanoethylation," Organic Reactions, volume 5, 1949, page 86.